United States Patent [19]

Habig et al.

[11] Patent Number: 5,185,109
[45] Date of Patent: Feb. 9, 1993

[54] EXTRUSION BLOW-MOLDING MACHINE CONTROL

[75] Inventors: Thomas F. Habig, Batavia; Wayne D. Beninghaus, Milford, both of Ohio

[73] Assignee: Cincinnati Milacron Inc., Cincinnati, Ohio

[21] Appl. No.: 758,663

[22] Filed: Sep. 12, 1991

[51] Int. Cl.⁵ .................. B29C 49/04; B29C 49/78
[52] U.S. Cl. ........................... 264/40.5; 264/40.1; 264/40.7; 264/541; 425/146; 425/532
[58] Field of Search ............ 264/40.1, 40.5, 40.7, 264/541; 425/140, 141, 145, 147, 532, 150

[56] References Cited

U.S. PATENT DOCUMENTS

| | | | |
|---|---|---|---|
| 3,795,719 | 3/1974 | Morecroft et al. | 425/145 |
| 4,159,293 | 6/1979 | Fukase et al. | 264/40.5 |
| 4,224,560 | 9/1980 | Uekusa | 264/40.5 |
| 4,424,178 | 1/1984 | Daubenbuchel et al. | 264/40.1 |
| 4,444,702 | 4/1984 | Thomas et al. | 264/40.1 |
| 4,486,830 | 12/1984 | Taylor et al. | 364/146 |
| 4,551,289 | 11/1985 | Schwab et al. | 264/23 |
| 4,745,541 | 5/1988 | Vaniglia et al. | 364/141 |
| 4,959,001 | 9/1990 | Langlois et al. | 425/145 |
| 4,971,542 | 11/1990 | Langlois et al. | 425/145 |

FOREIGN PATENT DOCUMENTS

| | | | |
|---|---|---|---|
| 2152837 | 4/1973 | Fed. Rep. of Germany | 264/541 |
| 56-28830 | 3/1981 | Japan | 264/541 |
| 58-42437 | 3/1983 | Japan | 264/40.1 |

Primary Examiner—Jan H. Silbaugh
Assistant Examiner—Catherine Timm
Attorney, Agent, or Firm—John W. Gregg

[57] ABSTRACT

Extrusion of a tubular parison for blow molding is controlled according to a program of set point data defining parison wall thicknesses and extrusion rates. Progress of purge of plasticized material from an accumulator through a variable annular gap is measured. Parison profile set point signals defining wall section thickness at points correlated with progress of purge of the accumulator are produced in response to the measured progress. Purge velocity set point signals defining purge velocities correlated to selected profile points are produced in response to progress of purge of the accumulator. Variation of the annular gap is controlled in response to the parison profile set point signals and velocity of purge of the accumulator is controlled in response to the purge velocity set point signals.

6 Claims, 4 Drawing Sheets

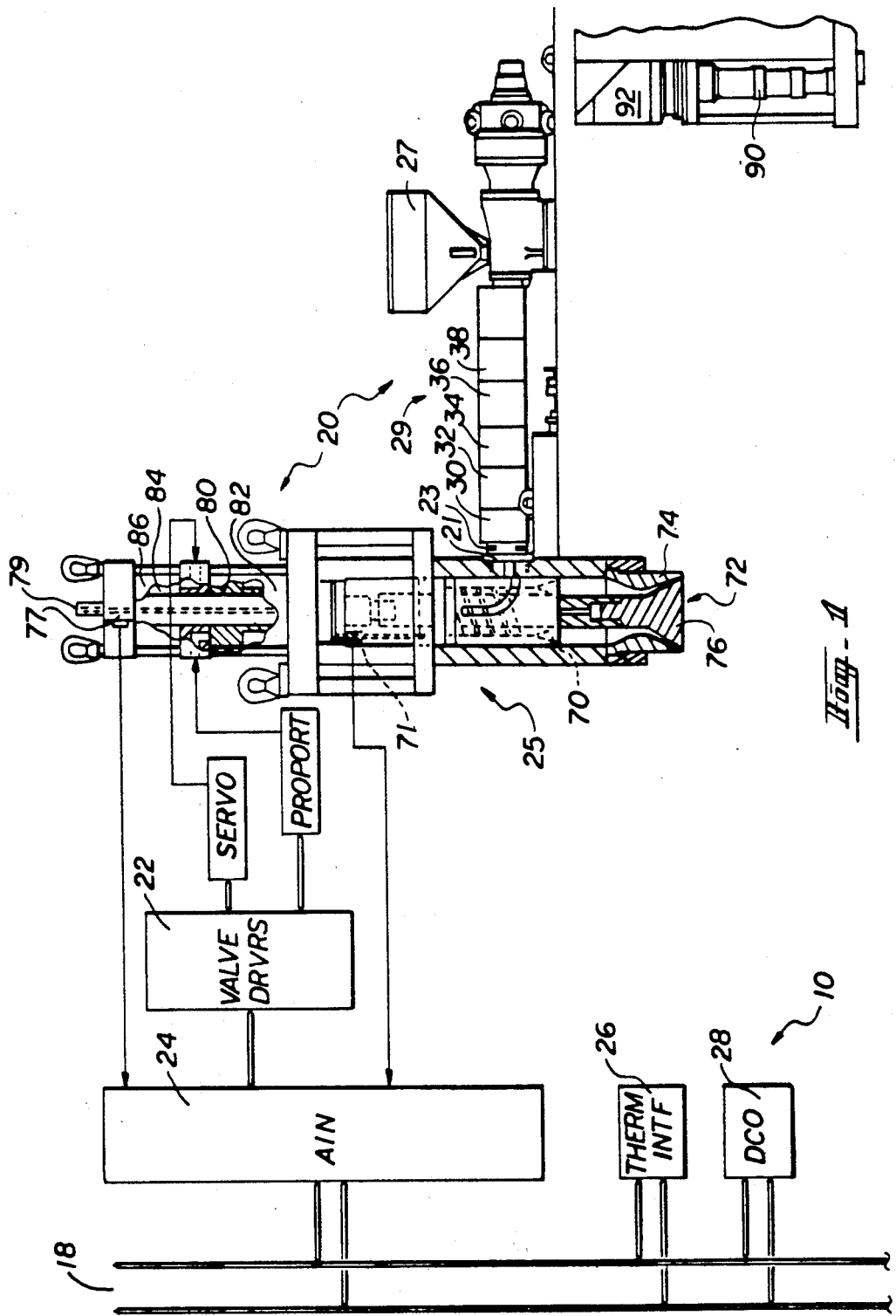

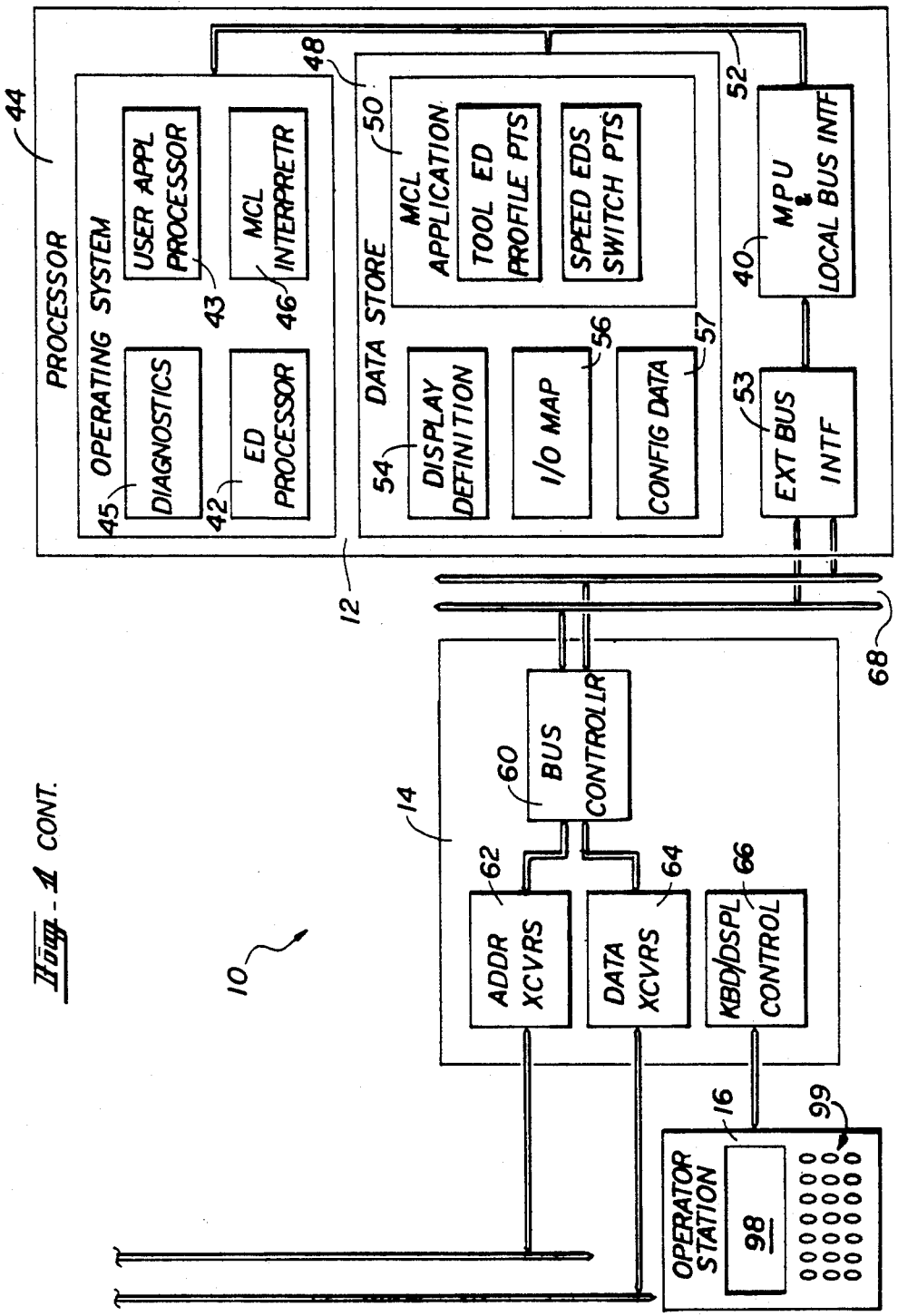

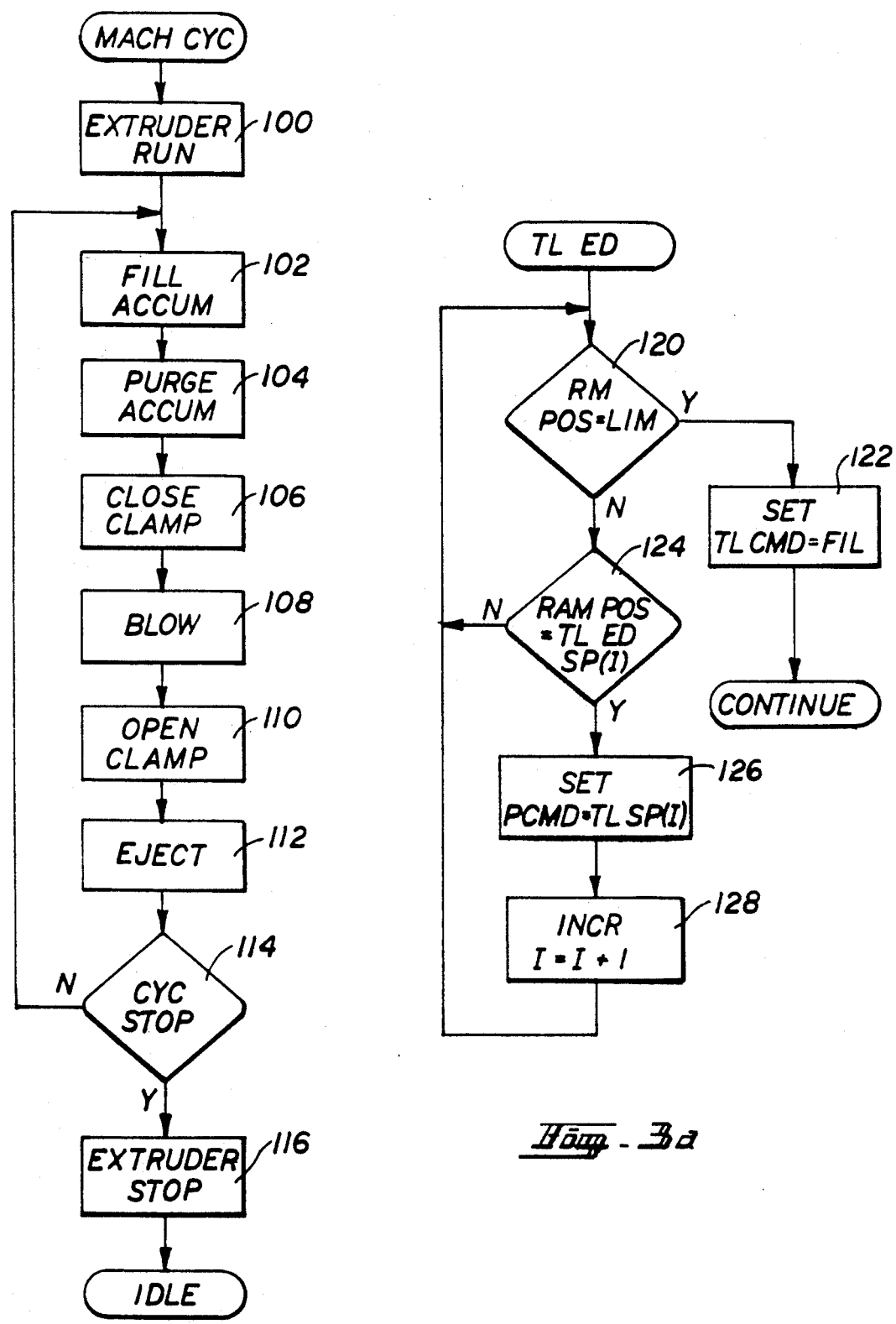

EXTRUSION BLOW-MOLDING MACHINE CONTROL

BACKGROUND OF THE INVENTION

I. Field of the Invention

This invention relates to control of extrusion blow molding machines. In particular this invention relates to control of mechanisms determining wall thickness of an extruded parison produced by an accumulator type extrusion blow molding machine. II. Description of the Prior Art Extrusion blow molding machines are known (from, for example U.S. Pat. No. 4,424,178) wherein an accumulator is provided from which a predetermined quantity of plasticized material is extruded to produce a hollow tubular parison to be blow molded to form a finished article. Further, it is known from this patent to provide means for varying wall thickness as the plasticized material is extruded from the accumulator. In particular, programmably controlled tooling means are known to vary the annular gap through which plasticized material is to be extruded. In conjunction with such known gap control it is known to vary the speed at which material is forced through said gap. Heretofore control of speed variation has been effected in response to progress of purge of the accumulator independently of control of the tooling means. Hence synchronization of gap variation and variation of extrusion(purge) speed has been imprecise tending to impair optimization of program parameters and particularly prohibiting maximization of purge speed hence prohibiting reduction of cycle time.

SUMMARY OF THE INVENTION

It is an object of the present invention to provide control of an extrusion blow molding machine wherein extrusion gap variation and extrusion speed variation are defined according to a single set of set points associated with progress of extrusion of a predetermined volume of material.

It is a further object of the present invention to provide control of wall thickness of an extruded parison by synchronizing control of extrusion gap variation with control of extrusion speed variation in response to measured progress of extrusion of a predetermined quantity of plasticized material.

It is a still further object of the present invention to provide control of wall thickness of an extruded parison by measuring progress of extrusion of a predetermined quantity of plasticized material and producing in response thereto parison profile set point signals defining a desired wall thickness and extrusion speed set point signals correlated to the parison profile set point signals.

In accordance with the aforesaid objects a control is provided for an extrusion blow molding machine wherein a tubular parison is formed by extrusion and the parison is blow molded to form a finished article. Plasticized material is admitted to an accumulating head including a movable ram until the ram has been displaced by a predetermined volume of material. The ram is subsequently advanced to purge the material from the accumulator through an annular opening of variable gap. A transducer measures advance of the ram and parison profile set point signals defining desired wall thicknesses of the parison are produced in response to the measured ram advance. The gap at the annular opening is controlled in response to the profile set point signals. Purge velocity set point signals defining a desired rate of extrusion of material are defined in terms of the parison profile set point signals. The rate of extrusion of material is controlled in response to the purge velocity set point signals and speed changes are consequently effected in synchronization with the profile set points.

Further objects and advantages of the present invention shall become apparent from the accompanying drawings and the description thereof.

BRIEF DESCRIPTION OF THE DRAWINGS

FIG. 1 is a schematic of an extrusion blow molding machine and control in accordance with the invention.

FIG. 2 is a flow chart illustrating the overall cycle of operation of the control of FIG. 1.

FIGS. 3a and 3b are flow charts illustrating the procedures by which parison profile set point signals and purge velocity set point signals are produced.

FIG. 4 is a flow chart of a procedure for calculating position data used by the procedures of the flow charts of FIGS. 3a and 3b.

DESCRIPTION OF THE PREFERRED EMBODIMENT

Figures 3B, 4:
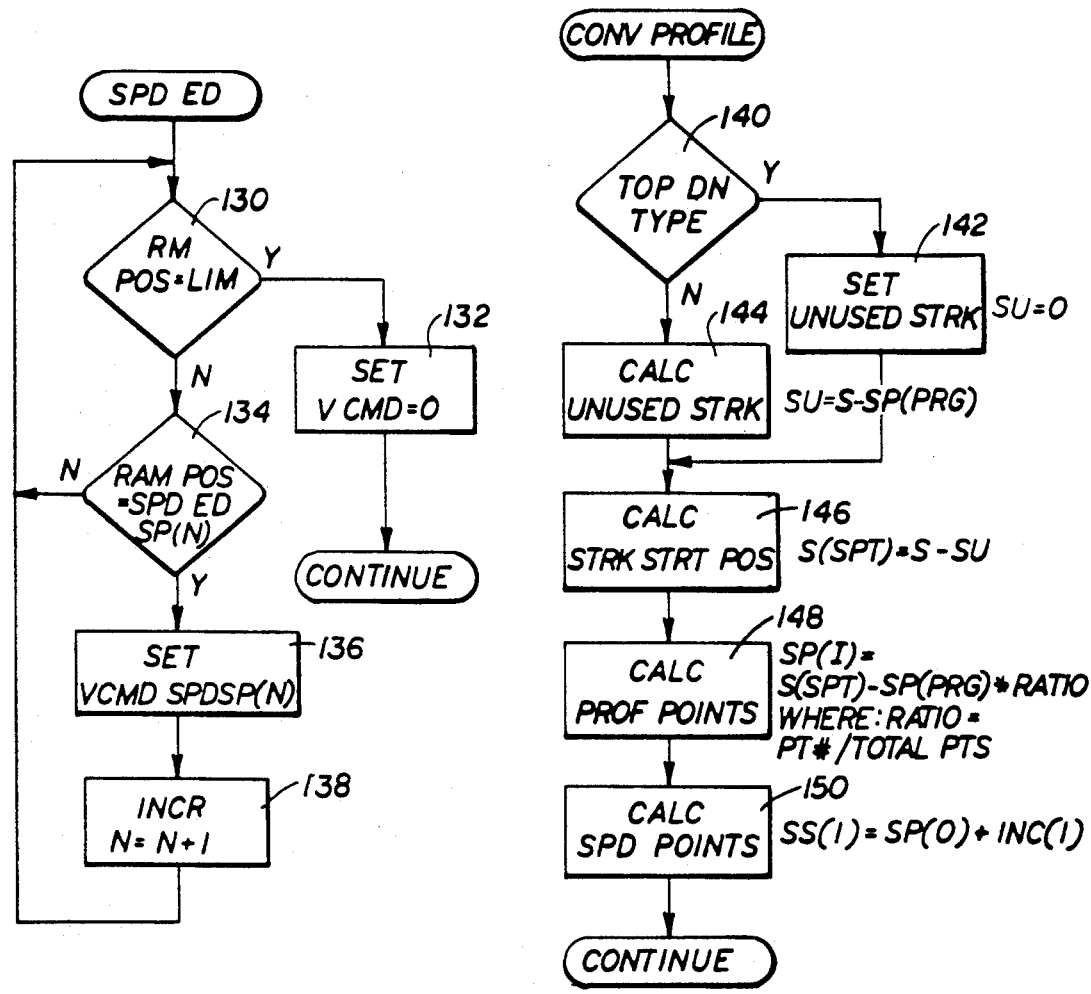

To illustrate the invention a control for an extrusion blow molding machine manufactured by Cincinnati Milacron Inc., the assignee of the present invention, shall be described in detail. While this control constitutes the preferred embodiment of the applicants, it is not their intention to limit the invention to the details thereof. Rather, it is the intention of applicants that the invention be defined in accordance with the appended claims and all equivalents thereto.

Referring to FIG. 1, a block diagram of a control system implementing control in accordance with the present invention shall be described. Control system 10 includes a processor module 12, a bus adapter 14, an operator station 16, an input/output interface bus 18 for connection of a variety of signal interface modules and a valve control module 22. Output signal interface modules are selected to produce, in response to digital command signals, analogue and binary control signals meeting the voltage and current requirements of the controlled devices. Input signal interface modules are selected to produce logic level digital representations of analogue and binary input signals representing conditions of machine devices.

Machine mechanisms requiring variable operation and actuated by hydraulically driven actuators are controlled by control valves responsive to control signals produced by valve drivers 22. Applicants have chosen to include in valve drivers 22 the Model 1602 amplifier and control module for control of a servo valve for varying the annular gap at tooling 72 and the Model 5004 amplifier and control module for control of a proportional valve for operating the accumulator purge ram, both control modules available from Rexroth Corp. Analogue control signals representing command inputs to valve drivers 22 are produced by analogue input/output interface module 24. Position and velocity measurement signals produced by transducers associated with the controlled mechanisms are converted from analogue input signals to digital input signals by analogue input/output interface module 24.

Heating elements such as resistance heating bands 30 through 38 are controlled by thermocouple interface module 26 which receives thermocouple signals representing measured temperatures of machine components and produces control signals for controlling energization of the heating elements.

Binary control of valves and other devices, typically selectively operated between two states according to a sequence of operation, are controlled by binary control signals output by DC output interface module 28.

Control of a cycle of operation of the machine is effected by execution of programs by processor 12. Processor 12 is implemented to conform to the system architecture of a programmable logic controller such as is illustrated by U.S. Pat. No. 4,486,830. A microprocessor 40 executes application programs 50 stored in data store 48 under control of operating system programs stored in memory 44. Applicants have chosen the 80186 microprocessor available from Intel Corporation as microprocessor unit 40. Data is exchanged between microprocessor 40, operating system store 44 and data store 48 via local bus 52. Diagnostic programs 45 defining procedures designed to detect system faults are stored in operating system program store 44

Application programs 50 are written using a machine control language (MCL) as cycle statements which are processed under direction of MCL interpreter programs 46 Data exchanges between input and output registers and the input and output interface modules occurs periodically at a programmable cycle interval during which active cycle processing occurs to effect execution of the application programs. Inputs and outputs are generally identified by variable names within application programs 50 and are related to specific devices by means of input/output mapping data 56.

Execution of application programs 50 produces values for output as binary control signals and as set point values for analogue outputs. Servomechanism control is effected by definition of control algorithms relating measured values of selected process parameters to values of control signals affecting the controlled process. Sequential control of selected machine processes may be effected by a technique of event detection such as is described in U.S. Pat. No. 4,745,541. In accordance with this technique, event detector processing routines 42 control execution of a predetermined number of processes conveniently defined as sequences of events detectable as occurrence of predetermined changes in selected signals. For each event detector controlled process, predetermined activity of a selected input results in, selectively, activation and deactivation of processing of cycles, output of set point commands, and selection of alternative inputs to be monitored for detection of subsequent events.

In addition to effecting control of the machine cycle of operation, processor 12 controls the display of information at the display module 98 of operator station 16. The appearance of data to be displayed is determined according to display definition programs 54 stored within data store 48 Display definition data is processed in accordance with user application processor routines 43 stored with operating system programs 44. Data relating to parameters of the desired finished article and to actual machine performance may be advantageously displayed in bar graphs and line graphs under control of the display definition routines. Set point data used to control the profile of the wall section of the extruded parison may be entered via keyboard switches 99 at operator station 16.

Data communication between processor 12, and operator station 16 as well as input/output interface bus 18 is accomplished through Multibus adaptor 14. Address and data signals to be exchanged with processor 40 are transferred through external bus interface 53. Address transceivers 62 and data transceivers 64 provide signal buffers between bus controller 60 and the address and data signal lines of interface bus 18. Bus controller 60 controls transfer of data between interface bus 18 and the control multibus 68 Keyboard and display controller 66 provides signal interfacing between keyboard 99 and display 98 of operator station 16.

Continuing with reference to FIG. 1, an accumulator 25 and extruder 29 of machine 20 are shown Raw material to be molded is fed into extruder 29 in powder or pellet form from hopper 27. Extruder 29 comprises a barrel 23 containing one or more screws (not shown) for feeding and working of the raw material, as is well known. In addition to mechanical working of the raw material by the screw within barrel 23, heater bands 30-38 provide heating of the barrel to assist with control of temperature of the plasticized material and, hence, its viscosity. Plasticized material exits the extruder and is admitted to accumulator 25 at inlet port 21 As the plasticized material enters accumulator 25 purge ram 70 is pushed away from tooling 72 by the force exerted by the entering material. Once a predetermined volume of plasticized material has been admitted to accumulator 25, as indicated by the position of purge ram 70, purge ram 70 is advanced toward tooling 72 Advance of purge piston 70 is effected by hydraulicly operated piston 80 within cylinder 82. Position of purge piston 70 is measured by linear potentiometer 71 producing an input signal to analogue input/output interface 24. The plasticized material is forced out of accumulator 25 through an annular gap created by tooling 72 thereby forming a hollow extruded article or parison. The annular opening created by tooling or die 72 is made variable by means of fixed member 74 and moveable member 76 reciprocal within a predetermined range. Movement of moveable member 76 is effected by hydraulicly operated piston 84 within cylinder 86. Position of tooling movable member 76 is measured by linear potentiometer 77 which produces a tooling position input signal to analogue input/output interface module 24. Both the rate of advance of purge piston 70 and the extent of opening of the annular gap are controlled during the advance of purge piston 70 to vary the profile of the wall section of the extruded article. Pressurized hydraulic fluid for actuation of pistons 80 and 84 is provided by hydraulic pump 90 driven by motor 92. Valves controlling operation of pistons 80 and 84 are controlled in response to control signals produced by valve drivers 22.

The extruded parison is blow molded to form a finished molded article within a mold cavity (not shown) defined by mating mold components cooperatively juxtaposed by a clamp mechanism (not shown). The article preform is expanded while the extruded material remains plastic to conform to the shape defined by the mold cavity. Expansion is effected by introduction of pressurized fluid through, for example, the accumulator 25 via a passage extending from end 79 through tooling moveable member 76. Following curing of the material, the mold cavity is opened and the finished article is ejected.

The overall cycle of operation of the machine just described is illustrated in FIG. 2. With the machine in cycle, the extruder 29 runs continuously to produce plasticized material for processing as represented by step 100. At step 102 the plasticized material is admitted to the accumulator to fill the accumulator with a predetermined volume thereof. At step 104 accumulator 25 is purged producing an article preform. At step 106 the clamp mechanism is closed to form a mold cavity. At step 108 the article preform is blow molded to form a finished article. At step 110 the clamp mechanism is opened to permit ejection of the finished article at step 112. The machine cycle continues at step 102 unless automatic cycling has been disabled by operation of a cycle stop input as determined at decision step 114. If automatic cycling is ceased, extruder 29 is stopped at step 116 and the machine is idle pending restarting of automatic operation. Control of this cycle of operation is effected by execution of application programs 50 by processor 12. Of primary interest herein is control of the preform profile according to user input data defining relative wall thickness in terms of preform length.

FIGS. 3a and 3b illustrate event detection procedures used to control the rate of parison extrusion and the tooling gap distance defining parison wall thickness. During purge of accumulator 25 associated with step 104 of FIG. 2, event detectors are enabled which are responsive to an input signal representing the position of purge piston or ram 70 to produce output commands for both tooling and purge speed. Set point data defining tooling positions are stored for a predetermined number of purge ram positions equally spaced throughout the desired distance of advance of purge ram 70. Each of these positions, hereinafter referred to as profile points, has associated therewith a tooling position defining the annular gap created by tooling 72. In applicants' preferred embodiment fifty profile points are accommodated. Purge speed set point data for a predetermined number of purge speed changes to be effected during purge of the accumulator is also programmed in association with selected profile points. Applicants' invention associates purge speed changes with selected profile points to facilitate the synchronization of speed and gap changes to produce a desired parison wall section profile. In applicants preferred embodiment, five purge speeds may be programmed.

The tooling event detector illustrated by the flow chart of FIG. 3a detects coincidence between a profile point and the current position of purge piston 70. If the detected position corresponds with a predetermined stroke limit, as illustrated by decision step 120, the tooling position command is set to a value defining a refill position by process step 122 and thereafter advance of purge piston 70 is ceased to permit refilling of accumulator 22. If coincidence of the current position of purge piston 70 and a profile point is detected, as illustrated by decision step 124, the tool command output is set to the associated tooling position by process step 126. The stored tooling position data is output through interface bus 18 to effect movement of movable member 76 to the commanded position. At process step 128 the event detector index is incremented to identify the next profile point to be used for comparison with the input signal representing the position of purge piston 70 and event detector processing continues with the newly identified profile point.

The purge speed event detector illustrated by the flow chart of FIG. 3b detects coincidence between a selected profile point having associated therewith a purge speed change and the current position of purge ram 70. If the detected position of purge ram 70 corresponds to the predetermined stroke limit, as illustrated by step 130, the purge speed is set to zero by process step 132 to permit refilling of accumulator 22. If coincidence of the current position of purge piston 70 with a selected profile point is detected, as illustrated by decision step 134, the speed command is set to the stored set point value at step 136 and is output via interface bus 18 to effect a change of speed of advance of purge piston 70 At process step 138 the event detector index is incremented to identify the next selected profile point to be used for comparison with the input signal representing the position of purge piston 70.

It will be appreciated that the length of stroke of purge ram 70 required to produce a desired parison is a function of the volume of material needed to form the parison and the effective area of purge ram 70. Stroke length is programmable as a percentage of the maximum permissible stroke distance defined by the structure and components of accumulator 22. The purge stroke may be effected from the fully retracted position of purge ram 70 or from a starting location the required stroke length from the bottom limit In either case, profile points are evenly spaced throughout the stroke length. Therefore, the actual position of purge piston 70 associated with each profile point is dependent on the stroke length and the starting location of the purge stroke. In order for the event detectors illustrated by FIGS. 3a and 3b to detect the profile point positions, it is necessary to generate position values which will correspond to the values of the monitored input signal as purge piston 70 is advanced. A procedure for generating this position data is illustrated by the flow chart of FIG. 4. Whenever data is entered affecting the profile points, the procedure of FIG. 4 is executed to produce the appropriate position data.

Referring to FIG. 4, a determination is made at decision step 140 whether the purge stroke is effected from the fully retracted position of purge piston 70. This characteristic is advantageously indicated by machine configuration data 57 stored in memory 48 which is examined in association with execution of decision step 140 In applicants' preferred embodiment position of purge piston 70 is measured so as to increase from the lower limit and the procedure for calculation of position data illustrated by FIG. 4 accommodates this directional convention. Therefore, if the purge stroke is to be effected from the fully retracted position. i.e . purge stroke is of the top down type, the value of the unused portion of the available stroke distance SU is set equal to zero at process step 142. If the purge stroke is to be effected the stroke length distance from the lower limit, the unused stroke length SU is calculated at process step 144 by subtracting the programmed stroke length $SP_{PRG}$ from the total available stroke length S. At process step 146 a value for the starting location $S_{SPT}$ of the purge stroke is calculated as the difference between the available stoke length S and the offset for the unused portion of stroke length SU. At process step 148 the profile point position values $SP_I$ are calculated as the difference between the stroke starting position $S_{SPT}$ and the portion of the programmed stroke length $SP_{PRG}$ associated with the profile point identified by the index I. The portion is determined by the product of the programmed stroke length $SP_{PRG}$ and the ratio of the number of the selected profile point to the total number of profile points. It will be appreciated that should the position of purge piston 70 be measured so as to increase from the fully retracted position toward the lower limit, the procedure for calculation of position must assume the required directional convention.

It will be recalled that applicants' invention provides for association of purge speed changes with selected profile points. Purge speed set point data entered via operator station 16 will include the index number I of the selected profile point for each speed change Applicants have chosen to use dedicated memory registers for storage of profile point position data and for indices identifying profile points at which speed changes are to be effected. Therefore the position data of these profile points is located through the indices stored at the dedicated memory registers by adding the index value $INC_I$ to the profile point index for the position data of the first profile point $SP_0$ as illustrated by process step 150 of FIG. 4. The position data of the selected profile points are copied to the storage locations $SS_I$ for the purge speed event detector identified by the associated purge velocity set point index I.

The association of purge speed changes with profile points defining tooling gap is particularly advantageous for adjusting the program data to obtain the optimum speed for producing a desired parison wall section profile. It will be appreciated that parison length varies as a function of the viscosity of the extruded material, purge speed and tooling gap. In order to obtain the desired distribution of material throughout the length of the parison wall section it is helpful during set-up to enter tooling set point values at selected profile points which will result in a readily detected band in the extruded article. By virtue of applicants' invention, calibration of the effects of speed and tooling changes relative to such bands is greatly eased since the speed changes are effected relative to selected profile points. In general, the synchronization of speed changes with profile points simplifies the establishment of program data to obtain the maximum purge speed at which a desired parison profile can be produced resulting in reduced cycle time for production of finished molded articles.

What is claimed is:

1. In a method for programmed control of extrusion blow molding wherein for each article to be blow molded a predetermined quantity of plasticized material is loaded into an accumulator and purged therefrom through a variable annular gap to form a tubular parison, the purge being controlled according to a program of parison profile set point data defining desired parison wall thicknesses associated with locations along the length of the parison to be formed, the locations being equally spaced one from another along the parison length, the improvement comprising the steps of:
   a. storing programmed stroke length data defining a portion of an available stroke length effective to purge the accumulator of the predetermined quantity of material;
   b. storing desired purge speed data defining desired rates of purge associated with locations along the parison length;
   c. calculating position values in response to the stored stroke length data, the available stroke length, and the parison profile set point data, the position values defining locations along the stroke length corresponding to the locations associated with the parison profile set point data;
   d. storing the position values;
   e. measuring a position representing progress of purge of the predetermined quantity of material from the accumulator;
   f. producing parison profile set point signals and purge velocity set point signals in response to the parison profile set point data, the stored desired purge speed data, the stored position values and the measured position;
   g. controlling the rate of purge of material from the accumulator in response to the purge velocity set point signals; and
   h. varying the magnitude of the annular gap during purge of the accumulator in response to the parison profile set point signals.

2. The method of claim 1 wherein the portion of stroke length defining the effective purge stroke is specified as a percentage of the available stroke length and the measured position represents an absolute magnitude relative to a fixed reference.

3. The method of claim 2 wherein the locations along the parison length are specified as proportional increments and the step of calculating position values further comprises the steps of:
   a. converting the proportional values to absolute values relative to the same reference as the measured position; and
   b. storing each absolute value in association with a unique parison profile point index value.

4. The method of claim 3 further comprising the steps of:
   a. retrieving an absolute value identified by the parison profile point index of each parison profile point associated with a purge velocity set point; and
   b. storing the retrieved absolute value in association with a purge velocity set point index.

5. The method of claim 4 wherein the step of producing purge speed set point signals further comprises the steps of:
   a. continuously comparing an absolute value identified by a purge velocity set point index with the measured position;
   b. recalling a stored purge velocity set point value upon detecting coincidence between the absolute value and the measured position;
   c. incrementing the purge velocity set point index; and
   d. repeating step a through c until completion of purge of material from the accumulator.

6. The method of claim 3 wherein the step of producing parison profile set point signals further comprises the steps of:
   a. continuously comparing an absolute value identified by a parison profile set point index with the measured position;
   b. recalling a programmed parison profile set point value upon detecting coincidence between the absolute value and the measured position;
   c. incrementing the parison profile point index; and
   d. repeating steps a through c until completion of purge of material from the accumulator.

* * * * *